May 9, 1950  C. C. FUERST  2,507,149
TWO-BLADE SETTING TYPE SHUTTER
Filed Jan. 7, 1948  3 Sheets-Sheet 1
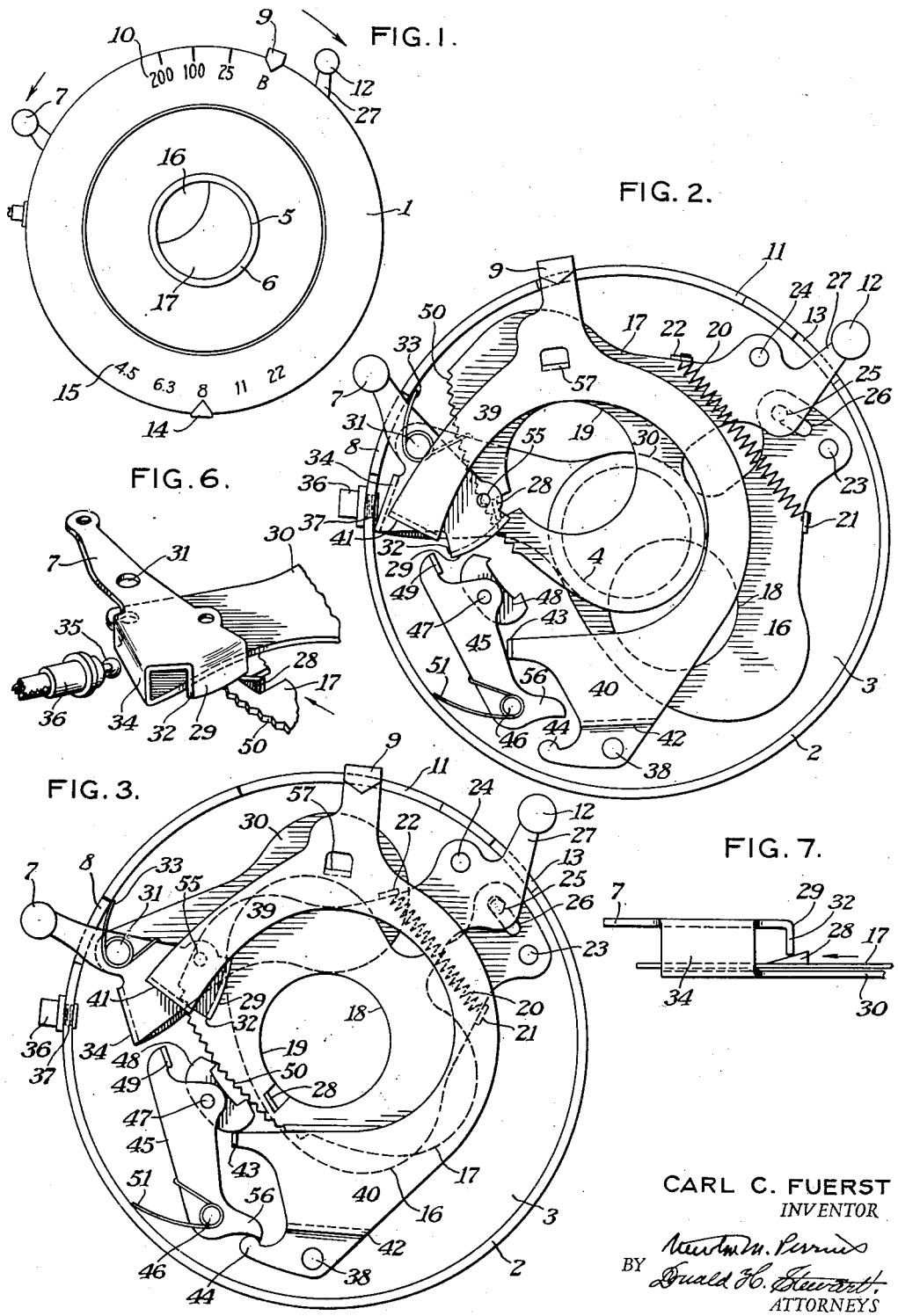
CARL C. FUERST
INVENTOR
BY
ATTORNEYS May 9, 1950 C. C. FUERST 2,507,149
TWO-BLADE SETTING TYPE SHUTTER
Filed Jan. 7, 1948 3 Sheets-Sheet 2

CARL C. FUERST
INVENTOR
BY
ATTORNEYS

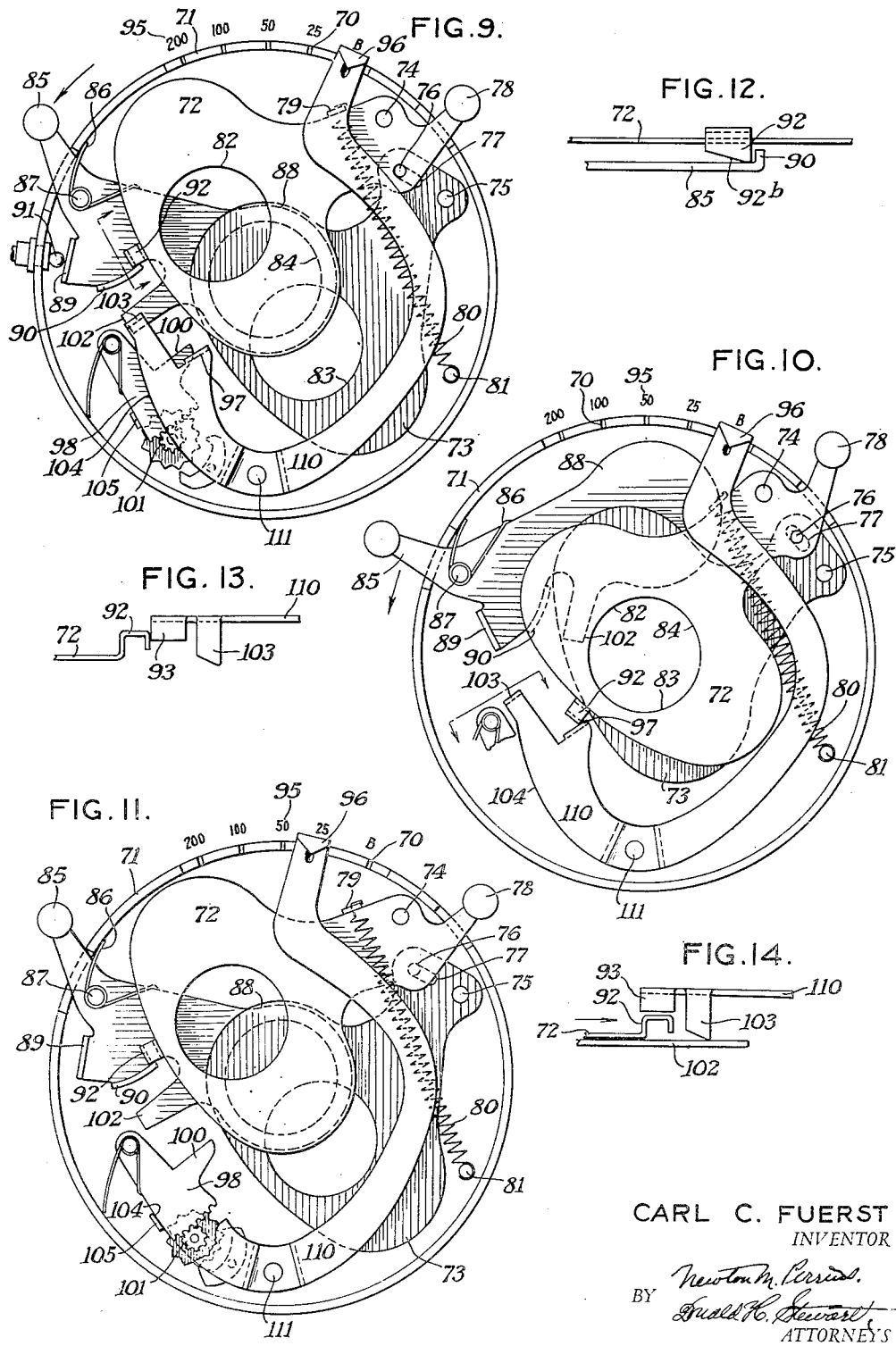

Patented May 9, 1950

2,507,149

UNITED STATES PATENT OFFICE 2,507,149

TWO-BLADE SETTING TYPE SHUTTER

Carl C. Fuerst, Rochester, N. Y., assignor to Eastman Kodak Company, Rochester, N. Y., a corporation of New Jersey Application January 7, 1948, Serial No. 1,008

17 Claims. (Cl. 95—62)

This invention relates to photography and more particularly to shutters for photographic cameras. One object of my invention is to provide an inexpensive shutter which has a reasonable range of exposures including a relatively high-speed exposure. Another object of my invention is to provide a shutter of the class described including a minimum number of parts. A still further object of my invention is to provide a shutter which may be constructed largely of metal stampings and in which there are but few parts which should require careful adjustment in assembly. A still further object of my invention is to provide a shutter of the setting type in which the setting lever may both be used for setting and for producing a prolonged exposure. Still another object of my invention is to provide a shutter in which a number of the parts perform a number of different functions in order to reduce the total number of parts required in the shutter, and other objects will appear from the following specification, the novel features being particularly pointed out in the claims at the end thereof.

One of the large parts of the cost of a hand camera, and particularly of a folding camera, is the cost of a shutter because ordinarily shutters consist of a large number of parts which must be made and assembled with a high degree of accuracy to provide a reasonable range of exposures. My present invention is particularly directed to a shutter made of very few parts in which quite a number of the parts are arranged to perform a number of different functions to keep the number of parts to a minimum. The preferred embodiment of my invention includes a shutter of the setting type, since it is generally recognized that such shutters are more accurate and are less liable to "shake" than when the shutter is of the so-called automatic type in which sufficient pressure must be applied to the trigger to first set and then release the shutter-operating spring.

Coming now to the drawings wherein like reference characters denote like parts throughout:

Fig. 1 is a front plan view of a shutter casing showing a shutter constructed in accordance with and embodying a preferred form of my invention;

Fig. 2 shows the shutter of Fig. 1 with the shutter cover removed to expose the operating mechanism and with the parts set for a high-speed exposure;

Fig. 3 is a view similar to Fig. 2 but with the parts set for a low-speed exposure and with the shutter blades in an open position making the exposure;

Fig. 6 is a fragmentary detail in perspective showing portions only of the shutter casing and showing the trigger and portion of a cover blind;

Fig. 7 is a fragmentary detailed view showing a portion of a shutter blade moving toward its set position and illustrating its relation to the trigger;

Fig. 9 is a front plan view of a shutter casing showing mechanism constructed in accordance with and embodying a second preferred form of my invention. In this view, the shutter parts are shown with the shutter set for a bulb exposure so that by depressing the trigger, a bulb exposure will result;

Fig. 10 is a view similar to Fig. 9 but with the shutter blades shown in an open position;

Fig. 11 is a view similar to Figs. 9 and 10 but with the shutter set for a $1/25$ of a second exposure;

Fig. 12 is a fragmentary detail side elevation showing parts of a shutter blade and the trigger blade retaining arcuate flange;

Fig. 13 is a view similar to Fig. 12 but showing a side elevation of parts of the time-setting lever and its relationship to one of the shutter blades; the parts being shown in the position they assume when the blades are wide open; and Fig. 14 is a view similar to Fig. 13 but with the parts shown in a releasing position which they assume when the trigger returns to its normal position of rest.

Figure 4:
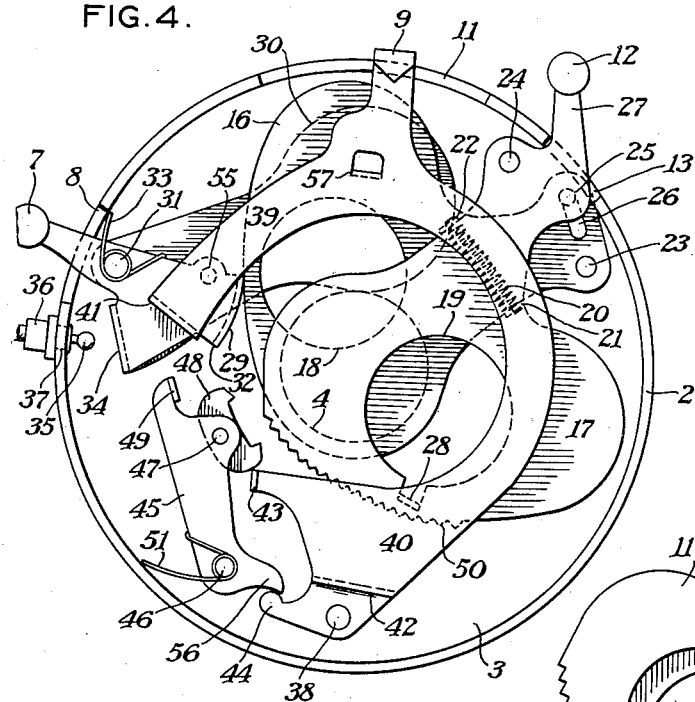
Fig. 4 is a view similar to Figs. 2 and 3, but with the shutter parts in a position of rest and for a slow-speed exposure.

My invention consists broadly in providing a camera shutter of exceedingly few parts for the range of exposures which can be obtained with it, and I have been able to accomplish this by utilizing a number of the parts to perform more than one function and by eliminating many of the parts normally used in such shutters. My shutter is of the setting type; the setting lever being formed by a part of one shutter blade, thus eliminating both a master member and a setting member. To operate the blades, I have used a single spring directly connected to the blades. A cover blind is formed integral with the shutter trigger and the trigger coacts with a retard device, so that this retard, or delay mechanism is always moved to an inoperative position when the shutter is at rest and setting can be performed without the delay mechanism operating. By transferring control of the shutter blades from the trigger to the setting lever for "bulb" exposures, I have been able to simplify the mechanism. To do this, the trigger is rendered inactive and the cover blind is moved from its operative position obscuring the exposure aperture by means of the exposure-setting lever.

More specifically, my shutter may comprise a shutter cover plate 1 mounted on an upstanding flange 2 of a shutter casing 3. Cover plate 1 has the usual central aperture 5. The shutter casing 1 is provided with a central opening 4. If a better grade of lens is used, the aperture 5 in the cover 1 may be provided with a lens cell 6 to support the front element of an objective. A trigger member 7 projects through a slot 8 in the shutter casing and an exposure-setting lever 9 is movable over a scale 10. The lever 9 projects through a slot 11 in the upstanding flange 2 of the shutter. A setting lever 12 projects from the shutter casing through an aperture 13. The usual type of diaphragm lever 14 may be mounted to move over a diaphragm scale 15.

I have indicated in Fig. 1 that my shutter may include speeds of 1/200, 1/100, 1/25 of a second, and "bulb"; this being a relatively wide range of exposures for an inexpensive shutter. It is quite possible that additional exposures, both on the high and low automatically controlled range of exposures, can be obtained, but this would probably add expense to the shutter and, since this is primarily an inexpensive shutter, it is felt that the range of exposures above given will be sufficient.

In order to obtain these exposures and to obtain a mechanism capable of making a 1/200 of-a-second exposure (with an exposure aperture of say one-half inch), I make the shutter blades 16 and 17 of the apertured symmetrical type, one being right-hand and the other being left-hand. Blade 16 may have a round aperture 18 and blade 17 may have a similar round aperture 19; these two apertures being designed to cross the exposure aperture 4 in the shutter when the shutter is released. The power for accomplishing this movement is a coil spring 20 attached to a lug 21 on blade 16 and attached to a lug 22 on blade 17. The spring, being directly connected to the shutter blades, always tends to move the blades toward each other to make an exposure. Blade 16 is pivotally mounted on a pin 23 in the shutter casing 3 and blade 17 is similarly mounted on a pin 24. There is a pin 25 and slot 26 connection between the two blades and, since this pin and slot lie in a position in which they will move between the pivot pins 23 and 24, the blades must always move together. While the shutter blades are substantially the same in shape, one being right-hand and one being left-hand, they differ in some respects. For instance, blade 17 has an extension 27 which projects through the aperture 13 in the flange 2 and terminates in a handle 12 which may be used to set the shutter. This setting movement is accomplished by pressing inwardly on the handle 12, thus causing the shutter blades to move to their Fig. 2 position. In doing so, a beveled lug 28, best shown in Fig. 6, passes under a downwardly extending flange 29 carried by the trigger 7. As it snaps behind this flange it reaches the Fig. 2 position and the shutter blades will be held in their set position. During the setting movement a cover blind 30, which also is integral in the present embodiment with the trigger 7, as shown in Fig. 6, covers the exposure aperture 4 so that when the apertures 18 and 19 and the shutter blades move over the exposure aperture, no light passes through.

The trigger 7 is mounted upon a pivot 31 and may turn thereon and, as it turns, the flange 29, which is preferably a surface of rotation about the pivot 31 moves as the cover blind 30 moves from its aperture 4 obscuring position. After the cover blind is moved from the exposure aperture, the trigger lug 28 may pass the end 32 of the flange 29, permitting the spring 20 to draw the blades together rapidly and make an exposure. When the shutter trigger 7 is released, a spring 33 returns the trigger to its normal Fig. 2 position which is its position of rest. The trigger also has a downwardly extending flange 34 which is positioned to lie in the path of a plunger 35 of a cable release 36 which may be threadedly connected at 37 to the shutter, if desired. Thus, the operation of this cable release may move the trigger through its cycle of operations.

The speed of the shutter is controlled by a shutter exposure-setting lever 9; this lever being pivoted at 38 to the shutter casing 3 and including two main arms 39 and 40. Arm 39 includes a downwardly extending flange 41 and arm 40 is formed downwardly at 42 toward the bottom of the shutter casing 3. Arm 40 likewise has a pair of spaced lugs 43 and 44, each of which is adapted to contact with and control the position of the delay mechanism which here consists of a lever 45 pivoted to the shutter casing on a pin 46 and pivotally supporting, at 47, a pallet 48. The arm 45 includes an upstanding lug 49.

When in the position of Fig. 2, the exposure-setting lever 9 holds the delay mechanism out of its operative position through the engagement of lug 43 with lever 45. However, if this lever is moved to the Fig. 3 position for low speeds, the pallet 48 may engage teeth 50 which are formed directly on one shutter blade, here shown as blade 17. While the shutter blades are operated by their spring 20, the pallet moves back and forth on the teeth 50 and slows up the operation of the blades. However, after the exposure is completed, I prefer to move the delay mechanism to an inoperative position so that when the shutter is being set, it is unnecessary to work against the delay mechanism. This is accomplished automatically by the trigger because the upstanding lug 49 on the delay mechanism lies in the path of the curved flange 29 of the trigger and, consequently, as the spring 33 moves the trigger to its rest position, the flange 32, by engaging lug 49, moves the delay mechanism to an inoperative position against the pressure of the spring 51 which tends to move the delay mechanism towards its operative position. Thus, the trigger 7 has this additional function which is extremely useful and permits the shutter to be set without interference from the relay mechanism.

Figure 5:
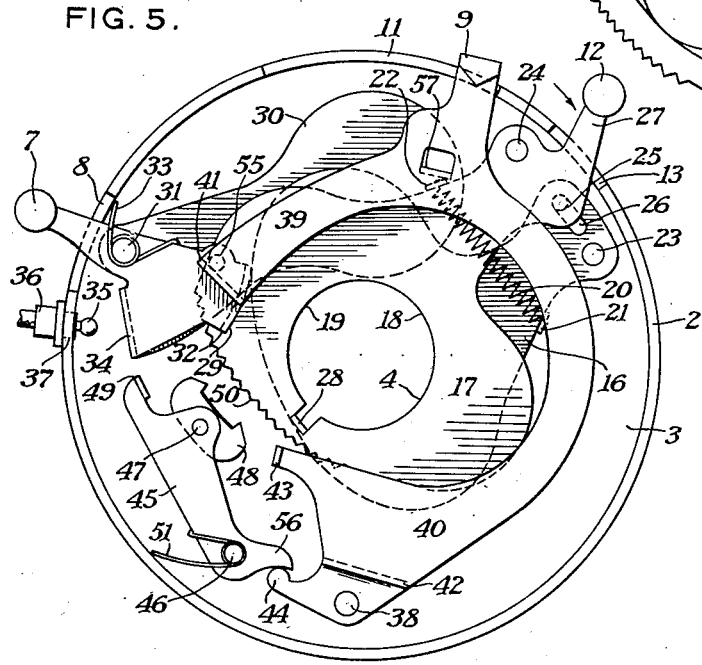
Fig. 5 is a view similar to Fig. 4 but with the parts in an open position during a "bulb" exposure.

If it should be desired to provide a prolonged exposure, usually known as "bulb," the exposure-setting lever 9 is moved to "B" on the scale 10 and this accomplishes a number of functions. First, the flange 41 on the arm 39 engages a pin 55 on the trigger, swinging the trigger from its position of rest in Fig. 2 to its inactive position in Fig. 5 in which position the cover blind 30 is held away from the exposure aperture 4. At the same time the lug 44 on arm 40 engages a tail 56 on the delay lever 45 swinging this lever to an inactive position, as shown in Fig. 5. The exposure-setting lever performs still an additional function in that it moves a downwardly formed stop 57 into the path of the upstanding lug 22 on the shutter blade 17; these two elements being adapted to coact to stop movement of the shutters when the apertures 18 and 19 register with, or lie over, the exposure aperture 4. The shutter is now conditioned for a "bulb" exposure. It is obvious that this exposure cannot be made as usual with the shutter trigger, since this has already been moved to its inactive position. The control of the shutter blades is therefore automatically shifted to the setting lever 12 so that by depressing this lever in the direction shown by the arrow in Fig. 5, the shutter blades move against the pressure of their spring 20 to open the exposure aperture 4. This will remain open until the setting lever is released, at which time the spring 20 will immediately close the shutter blades.

If no more "bulb" exposures are to be made, the lever 9 may be swung to any one of the different positions and this swinging movement automatically releases the trigger from its inactive position so that it may move to its Fig. 2 position; it releases the arm 44 from the arm 56 of the delay mechanism so that this mechanism may be again controlled in its position by the arm 43 and it removes the stop 57 from the path of the lug 22 of shutter blade 17. The control of the shutter blades is now restored to the trigger 7 in that the instantaneous or automatically controlled exposures are obtained by setting the shutter as before and releasing it by means of the trigger.

Figure 8:
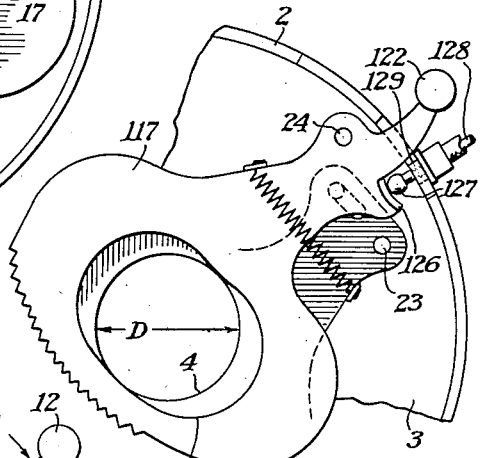
Fig. 8 is a fragmentary detail showing a portion of a shutter having blades constructed in accordance with another embodiment of my invention.

The highest speed obtainable with a given type of spring 20 is of course more or less determined by the opening in the shutter blade and, while I have indicated round openings in the blades 16 and 17 with which the highest type speed can be obtained, it is obvious that these holes may be made of other shapes as, for instance, elongated, as shown in the blade 117 in Fig. 8 where the opening 119 is considerably longer than the diameter "D" of the exposure aperture 4 in the shutter casing. If desired, as also illustrated in Fig. 8, a cable release may be used for making prolonged or "bulb" exposures. The shutter blade 117 may be equipped with a curved flange 126 extending upwardly and into the path of a plunger 127 of cable release 128 which may be connected by a thread 129 to the upstanding flange 2 of the shutter casing. Thus the cable release 128 may be used in lieu of the shutter-setting lever 122 which ordinarily is operated to produce "bulb" exposures.

It should be noticed that my shutter consists of extremely few parts and that these parts are mostly metal stampings which can be inexpensively produced and, in addition, that the shutter is comparatively simple to assemble. In fact, with the embodiment illustrated in the drawings the shutter mechanism may consist of only six movable parts, not including springs and rivets and the shutter casing and cover.

While I have shown in Fig. 1 a standard form of diaphragm-adjusting mechanism, this forms no part of my present invention and may be of any known type. If the least-expensive type of shutter is to be produced, a diaphragm of the type shown in U. S. Patent No. 1,787,797, Riddell, may be employed.

I have found that with the shutter mechanism structure above described, a two-hundredth of a second is not difficult to obtain when using a spring 20 of more or less normal weight for this type of shutter and, undoubtedly, a higher speed could be obtained, although if the higher speed is used, it would necessarily make it difficult, if not impossible, to obtain the slow automatic speed exposure of $1/25$ of a second which is usually considered necessary. It would require the delay mechanism to be more complicated and consist of more pieces and therefore the higher speed which can be obtained does not seem worthwhile.

The reduction in parts in the above-described shutter is largely accomplished by providing a number of different functions for a number of the levers which coact in different ways in different positions. For instance, the trigger and cover blind are in one piece and by engaging and holding a shutter lug on one shutter blade, both shutter blades are retained in a set position with the spring under tension until the trigger has been moved far enough to remove the cover blind from the exposure aperture. The trigger has the additional function of normally holding the delay mechanism out of an operative position and of releasing it to move to an operative position only when the trigger is moved to start an exposure. The shutter-setting lever, which determines the type of exposures, performs the unusual function of disabling the trigger and enabling the setting handle 12 which is carried directly by one shutter blade to be used to manually move the blades to an open position while the trigger is disabled. At the same time, the shutter-setting lever disables the delay mechanism and positions a stop in the path of the shutter blades to stop their movement in an open position, rather than riding past this position, as is accomplished in making an instantaneous exposure.

The operation of the shutter is extremely simple. The lever 9 is set for the required exposure and, if an instantaneous exposure is to be used, it is set for any one of the three graduations 10 on the speed scale shown in Fig. 1. The shutter is set by pushing the handle 12 in the direction shown by the arrow in Fig. 1, thereby directly pressing on one shutter blade and moving both shutter blades through their pin-and-slot connection into a set position in which a beveled pin 28 (also directly carried by a shutter blade) is brought into engagement with the trigger. Pressure on the trigger 7 will first swing the cover blind 30 away from the exposure aperture 4 while the shutter blade lug rides against the moving inside of the downwardly extending and arcuate lug 29 of the trigger. When the lug slips off the end 32 of the trigger flange, the spring 20 rapidly draws the two blades 16 and 17 towards each other, causing their openings 18 and 19 to open and close the exposure aperture 4. If the shutter should be set for a relatively slow exposure, such as a twenty-fifth of a second, the trigger engages the delay mechanism, moving it from its operative position so that the shutter can be easily set without operating the delay. Thus, the first part of the movement of the trigger 7 not only moves the cover blind 30 from the exposure aperture, but it likewise permits the lever 45 carrying the delay to move into a position controlled by the setting lever for delaying the shutter.

Should a bulb exposure be selected, the lever 9 is moved and this lever will transfer control of the shutter blades from the trigger 7 to the setting lever 12, since this lever moves the trigger and its cover blind both to inactive positions; moves the delay mechanism to an inactive position and interposes a stop in the path of a lug carried by a shutter leaf to limit the movement of the blades to a movement in which the exposure aperture 4 and the shutter apertures 18 and 19 are in register. Therefore, to make a bulb exposure, the handle 12 is depressed until the blades come to a stop, opening the shutter. It is held depressed for the required time and when released the spring 20 immediately returns the blades to their normal closed position. The trigger may return to its normal position of rest only when the shutter-setting lever is moved to an instantaneous exposure graduation on the scale 10. In a second embodiment of my invention there is a somewhat different delay mechanism and a more standard type of "bulb" exposure is possible using the trigger rather than the setting lever for releasing the shutter blades for an exposure. In addition, the retard, while still operated by the shutter blade itself may be of the type in which a delay element is moved into variable positions in the path of the blade for obtaining speeds of different durations.

In the embodiment of my invention shown in Figs. 9 to 14, the shutter casing 70 has an upstanding flange 71 in which shutter blades 72 and 73 are mounted on their respective pivots 74 and 75. A pin 76 and a slot 77 connect the shutter blades for movement and one shutter blade, here shown as 72, carries an extension or handle 78 for setting the blades. Blade 72 carries a lug 79 to which a spring 80 is attached; this spring being attached at its opposite end to a pin 81 to give a longer spring than is used with the first-described embodiment of my invention. The shutter blades each have openings 82 and 83 which are adapted to pass over an exposure aperture 84 in the shutter casing 70.

As in the first embodiment of my invention, there is a trigger 85 held in the rest position shown in Fig. 9 by means of a spring 86 encircling the pivot 87 and holding the cover blind 88 over the exposure aperture. The trigger is provided with flanges 89 and 90, the first flange lying in the path of a flexible release 91, such as the cable of a cable release, and the arcuate flange 90 being a surface of rotation about the pivot 87 and as indicated in Fig. 9 lying in the path of the beveled lug 92 carried by the shutter blade 72. Thus, when the setting lever 78 is depressed, the blades are moved apart and the beveled surface 92b moves up over the arcuate lug 90 to snap into the set position shown in Fig. 9.

If now the trigger 85 is depressed in the direction shown by the arrow in Fig. 9, the flange 90 will hold the blades against movement until the flange passes the downwardly projecting lug 92, at which time the blades will open and close for an instantaneous exposure unless the shutter is set for "bulb" exposures. Fig. 9 shows the shutter so set and, consequently, instead of opening and closing the blades, the blades will open, as in Fig. 10, and will remain open as long as the formed-over lug 92 remains in engagement with the stop 97 on the shutter exposure setting lever 94. This lever is pivoted at 111 to the casing and has a pointer 96 which extends over a suitable scale 95 diagrammatically shown in Fig. 9 and shown in more detail in Fig. 1.

Since the shutter blades move quickly under the impulse of the spring 80 if they are suddenly brought to rest they may rebound. This, of course, is undesirable, both after the completion of an instantaneous exposure and when the blades are brought to the fully opened position in Fig. 10 for a "bulb" exposure. Rebound is prevented when a "bulb" exposure is made because of the location of the setting lever stop 97 and because of the location of the bell-crank lever 98 which has an arm 100 lying in the path of the lug 92. As will be noticed from Fig. 9, as the lug 92 swings to open the blades, it strikes arm 100 of the bell-crank lever 98 so that the retard 101 or delay mechanism engages the blades and slows the blades up before they reach the stop 97. This very effectively prevents a rebound of the blades from their wide-open position.

When the trigger 85 is released, the cover blade 88 moves down over the exposure aperture 84 and the cover blade extension 102 will swing about the pivot 87 until it passes radially beneath the beveled downwardly extending lug 103, also carried by the shutter-setting lever 110. This position is shown in Fig. 14. As arm 102 passes under the beveled lug 103 and raises up the shutter-setting lever arm 94 thereby raising stop 97 of the shutter-setting lever so as to permit lug 92 of the shutter blade 72 to pass over the top of this stop, as is shown in Fig. 14. This restores the parts to their normal position of rest for again setting the shutter and releasing, if a "bulb" exposure is to be made. If, however, a delayed exposure is to be made, the lever 96 is set to the desired position, as to a 1/25 of a second position of Fig. 11. In this position, the edge 104 will be brought into contact with the upstanding lug 105 of the bell-crank lever 98, so that the retard arm 100 will intercept movement of the lug 92 for the time necessary to produce a 1/25 of a second exposure. By moving the shutter-setting lever 96 to the 1/25 of a second exposure position, the stop 97 is, of course, moved out of the path of the shutter lug 92, so that the shutter lug 92 only strikes the bell-crank arm 100 during this movement. When the fastest exposure (here, a 200th) is to be made, the edge 104 and lug 105 hold the delay mechanism 101 completely out of the path of the shutter lug 92 and, consequently, no delay at all occurs. While this form of delay mechanism—that is a bell-crank lever and gear retard—are known, so far as I am aware, the use of such a retard, operated by a shutter blade directly at a point of considerable mechanical advantage (since the lug 92 is spaced as far as possible from the pivot 74) is novel.

The bulb-exposure mechanism, while described herein, is also shown in my copending application Serial No. 1,007, for Bulb exposure mechanism for setting shutters, filed January 7, 1948.

In both of the above-described embodiments of my invention the construction is extremely simple involving very few shutter parts. In both instances apertured shutter blades move in opposite directions across an exposure aperture which is normally covered by a cover blade directly forming a part of the shutter trigger. In both embodiments, one shutter blade carries a lug directly engaging a delay or retard mechanism which mechanism can be moved to or from an operative position with respect to the shutter blade. In both embodiments, the two shutter blades are moved together and may be set by a handle directly formed on one shutter blade. An experimental shutter has proved quite satisfactory in operation and indicates that an exposure of at least 1/250 can be obtained without the use of an extremely strong spring and with the shutter having an aperture of approximately ½".

Having thus described my invention, what I claim as new and desire to secure by Letters Patent of the United States is:

1. A shutter for cameras comprising a casing having an exposure aperture, a pair of apertured shutter blades pivotally mounted in the shutter to cover and uncover the exposure aperture, a spring means for moving the shutter blades, a handle for setting the blades and tensioning the spring, a movable trigger including a cover blind and flange, the cover blind normally covering the exposure aperture, a lug on one shutter blade coacting with the flange on the trigger to hold the shutter blades against movement under the influence of the spring means until the trigger is moved a distance to remove the flange from the lug and to move the cover blind from the exposure area, characterized by the flange on the shutter trigger extending in a circumferential direction about the trigger pivot and in a direction to engage and hold the shutter lug while the trigger is moving through the greater portion of its path of movement, the shutter lug having a beveled surface to pass across the trigger flange while the shutter is being set and when the trigger is in a position of rest, a pin carried by the trigger, an exposure-setting lever, means for moving the exposure-setting lever to move the trigger through the engagement of the exposure-setting lever and the pin carried by the trigger whereby the shutter blades may be manually moved by the setting handle to make an exposure.

2. A shutter for cameras comprising a casing having an exposure aperture, a pair of apertured shutter blades pivotally mounted in the shutter to cover and uncover the exposure aperture, a spring means for moving the shutter blades, a handle for setting the blades and tensioning the spring, a movable trigger including a cover blind and flange, the cover blind normally covering the exposure aperture, a lug on one shutter blade coacting with the flange on the trigger to hold the shutter blades against movement under the influence of the spring means until the trigger is moved a distance to remove the flange from the lug and to move the cover blind from the exposure area, a delay mechanism movably mounted in the shutter and movable to and from an operative blade delaying position, said trigger flange having a normal rest position in engagement with the delay mechanism for holding the latter in an inoperative position whereby said shutter may be set without moving the delay mechanism.

3. A shutter for cameras comprising a casing having an exposure aperture, a pair of apertured shutter blades pivotally mounted in the shutter to cover and uncover the exposure aperture, a spring means for moving the shutter blades, a handle for setting the blades and tensioning the spring, a movable trigger including a cover blind and flange, the cover blind normally covering the exposure aperture, a lug on one shutter blade coacting with the flange on the trigger to hold the shutter blades against movement under the influence of the spring means until the trigger is moved a distance to remove the flange from the lug and to move the cover blind from the exposure area, a delay mechanism comprising a pivoted lever carrying an inertia device to and from a position in which it may engage teeth on a shutter blade, said flange on the shutter trigger moving said pivoted lever to an inoperative position as said trigger moves to a rest position whereby the shutter may be set while the delay mechanism is positioned out of a shutter-blade tooth-engaging position.

4. A shutter for cameras comprising a casing having an exposure aperture, a pair of apertured shutter blades pivotally mounted in the shutter to cover and uncover the exposure aperture, a spring means for moving the shutter blades, a handle for setting the blades and tensioning the spring, a movable trigger including a cover blind and flange, the cover blind normally covering the exposure aperture, a lug on one shutter blade coacting with the flange on the trigger to hold the shutter blades against movement under the influence of the spring means until the trigger is moved a distance to remove the flange from the lug and to move the cover blind from the exposure area, a delay mechanism comprising a pivoted lever carrying an inertia device to and from a position in which it may engage teeth on a shutter blade, said flange on the shutter trigger moving said pivoted lever to an inoperative position as said trigger moves to a rest position whereby the shutter may be set while the delay mechanism is positioned out of a shutter-blade tooth-engaging position, and an exposure-setting lever also including a means for engaging and moving the delay mechanism.

5. A shutter for cameras comprising a casing having an exposure aperture, a pair of apertured shutter blades pivotally mounted in the shutter to cover and uncover the exposure aperture, a spring means for moving the shutter blades, a handle for setting the blades and tensioning the spring, a movable trigger including a cover blind and flange, the cover blind normally covering the exposure aperture, a lug on one shutter blade coacting with the flange on the trigger to hold the shutter blades against movement under the influence of the spring means until the trigger is moved a distance to remove the flange from the lug and to move the cover blind from the exposure area, a delay mechanism comprising a pivoted lever carrying an inertia device to and from a position in which it may engage teeth on a shutter blade, said flange on the shutter trigger moving said pivoted lever to an inoperative position as said trigger moves to a rest position whereby the shutter may be set while the delay mechanism is positioned out of a shutter-blade tooth-engaging position, said inertia device comprising a pallet pivotally mounted on the pivoted lever, and an exposure-setting lever including an arm for engaging and moving the inertia device to vary engagement of the pallet with the teeth on the shutter blade to produce differently timed exposures.

6. A shutter for cameras comprising a casing having an exposure aperture, a pair of apertured shutter blades pivotally mounted in the shutter to cover and uncover the exposure aperture, a spring means for moving the shutter blades, a handle for setting the blades and tensioning the spring, a movable trigger including a cover blind and flange, the cover blind normally covering the exposure aperture, a lug on one shutter blade coacting with the flange on the trigger to hold the shutter blades against movement under the influence of the spring means until the trigger is moved a distance to remove the flange from the lug and to move the cover blind from the exposure area, a delay mechanism comprising a pivoted lever carrying an inertia device to and from a position in which it may engage teeth on a shutter blade, said flange on the shutter trigger moving said pivoted lever to an inoperative position as said trigger moves to a rest position whereby the shutter may be set while the delay mechanism is positioned out of a shutter-blade tooth-engaging position, and an exposure-setting lever also including a means for engaging and moving the delay mechanism, a projection on the exposure-setting lever and means to position the projection for limiting the opening movement of the shutter blades.

7. A shutter for cameras comprising a casing having an exposure aperture, a pair of apertured shutter blades pivotally mounted in the shutter to cover and uncover the exposure aperture, a spring means for moving the shutter blades, a handle for setting the blades and tensioning the spring, a movable trigger including a cover blind and flange, the cover blind normally covering the exposure aperture, a lug on one shutter blade coacting with the flange on the trigger to hold the shutter blades against movement under the influence of the spring means until the trigger is moved a distance to remove the flange from the lug and to move the cover blind from the exposure area, a delay mechanism comprising a pivoted lever carrying an inertia device to and from a position in which it may engage teeth on a shutter blade, said flange on the shutter trigger moving said pivoted lever to an inoperative position as said trigger moves to a rest position whereby the shutter may be set while the delay mechanism is positioned out of a shutter-blade tooth-engaging position, and an exposure-setting lever also including a means for engaging and moving the delay mechanism, a projection on the exposure-setting lever and means to position the projection for limiting the opening movement of the shutter blades, said exposure-setting lever simultaneously moving the delay from its inoperative position and positioning the stop to limit the shutter blade movement, and interengaging elements on the exposure-setting lever and trigger for moving the latter by the former when positioning the means for limiting movement of the shutter blades and moving the delay mechanism to an inoperative position.

8. A shutter for cameras comprising a casing having an exposure aperture, a pair of apertured shutter blades pivotally mounted in the shutter to cover and uncover the exposure aperture, a spring means for moving the shutter blades, a handle for setting the blades and tensioning the spring, a movable trigger including a cover blind and flange, the cover blind normally covering the exposure aperture, a lug on one shutter blade coacting with the flange on the trigger to hold the shutter blades against movement under the influence of the spring means until the trigger is moved a distance to remove the flange from the lug and to move the cover blind from the exposure area, an exposure-setting lever movable in the shutter for controlling the shutter for automatic or manually controlled exposures, and coacting parts on the exposure-setting lever and the trigger for transferring control of the shutter blades from the trigger to the setting lever for operating the shutter blades for a manually controlled exposure.

9. A shutter for cameras comprising a casing having an exposure aperture, a pair of apertured shutter blades pivotally mounted in the shutter to cover and uncover the exposure aperture, a spring means for moving the shutter blades, a handle for setting the blades and tensioning the spring, a movable trigger including a cover blind and flange, the cover blind normally covering the exposure aperture, a lug on one shutter blade coacting with the flange on the trigger to hold the shutter blades against movement under the influence of the spring means until the trigger is moved a distance to remove the flange from the lug and to move the cover blind from the exposure area, an exposure-setting lever movable in the shutter for controlling the shutter for automatic or manually controlled exposures, and coacting parts on the exposure-setting lever and the trigger for transferring control of the shutter blades from the trigger to the setting lever for operating the shutter blades for a manually controlled exposure, said coacting parts on the exposure-setting lever and trigger moving the latter by the former to an inoperative position, and a limiting stop carried by the exposure-setting lever for limiting the movement of the shutter blades when the handle normally used for setting the blades is operated to move the blades against the stop to an open position.

10. A shutter for cameras comprising a shutter casing having an exposure aperture therein, a pair of apertured shutter blades pivotally mounted and connected for opposite movement across the exposure aperture to make an exposure, a spring for moving the shutter blades in opposite directions, a handle for setting the blades to tension the spring, a pivotally mounted shutter trigger including a cover blind normally lying across the exposure aperture, coacting surfaces on a shutter blade and the trigger for holding the shutter blades in a set position when the setting handle is moved in one direction and to retain the blades in a set position during that portion of the trigger movement for moving the cover blind from the exposure aperture, the coacting surfaces on the shutter blade and cover blind thereafter disengaging whereby the shutter blades may move in opposite directions to make an exposure, a movably mounted delay mechanism including a shutter blade contact member, a spring urging the contact member into a shutter blade contacting position, and means carried by the trigger for engaging and moving the delay mechanism to a position in which the contact member cannot engage a shutter blade when the trigger is moved to a rest position in which the cover blind covers the exposure aperture.

11. A shutter for cameras comprising a casing having an exposure aperture, a pair of shutter blades pivotally mounted in the shutter to cover and uncover the exposure aperture, a spring means for moving the shutter blades, a handle carried by a blade for setting the blades, and tensioning the spring, a trigger including a cover blind and flange pivotally mounted on the shutter, a delay mechanism engaging projection carried by the trigger, the cover blind normally covering the exposure aperture, a projection on one blade coacting with the trigger flange to hold the blades in a set position with the spring under tension, said projection being released through movement of the trigger moving the flange and moving the cover blind from the exposure aperture, a delay mechanism movably mounted in the shutter to move in the path of the trigger projection, a speed-setting lever for moving the delay mechanism for movement to and from an operative position and means carried by a shutter blade for engaging and moving the delay mechanism, said delay mechanism being also movable by the trigger moving to a rest position in which the cover blind covers the exposure aperture.

12. The shutter defined in claim 11 characterized by the trigger also including a projection positioned to engage and move the delay mechanism mounted on the shutter to an inoperative position out of the path of the projection on the shutter blade, when the trigger is in a rest position whereby contact between said projection and the delay mechanism is prevented during setting of the shutter, movement of the trigger towards a shutter blade releasing position permitting said delay mechanism to move into the path of a shutter blade to delay the speed of operation thereof.

13. The camera shutter defined in claim 10 characterized in that the shutter includes a setting lever for determining the time of exposures, said setting lever being movable to limit movement of the delay mechanism under the impulse of its spring and toward a shutter blade engaging position.

14. A shutter for cameras comprising a shutter casing having an exposure aperture therein, a pair of apertured shutter blades, pivotal mounts for each blade carried near the edge of the shutter, said blades including means movable between their respective pivots for moving the blades together across the exposure aperture to make an exposure, a beveled lug extending from the plane of a shutter blade and spaced from the pivot of the blade, a spring connected to at least one shutter blade for driving both blades in opposite directions, a trigger, a pivotal mount for the trigger spaced from the pivots of the shutter blades and near another portion of an edge of the shutter, a cover blind carried by the trigger, and extending from the trigger pivot across the exposure aperture, a flange carried by the trigger lying in the path of the beveled lug on a shutter blade when the trigger is at rest and extending transversely thereof whereby said lug may snap over the flange when a blade is moved, a handle carried by a blade for moving the blade on the pivotal mount thereof to move the beveled lug into engagement with the trigger flange, said trigger moving the cover blind toward the shutter blade pivots and away from its aperture covering position to simultaneously move the flange from the beveled lug to make an exposure, said flange carried by the trigger having a length to retain the beveled shutter lug, and thereby both shutter blades against movement until the cover blind is removed from the exposure aperture.

15. The shutter for cameras defined in claim 14 characterized in that the shutter blade beveled lug is carried by an edge of the shutter blade on the opposite side of the blade from the blade pivot and is movable through an arcuate path towards and from the trigger pivot into and out of engagement with the trigger flange which is transverse to the direction of movement of the beveled lug on the shutter blade.

16. The shutter for cameras defined by claim 14 characterized in that the trigger flange being located closer to the shutter blade pivot than the shutter aperture is to the shutter blade pivot and being positioned so that one end of the flange lies in the path of the beveled lug on the shutter blade to be engaged thereby when said shutter blades are moved by the handle to a set position.

17. The shutter for cameras defined by claim 14 characterized in that the trigger flange being located closer to the shutter blade pivot than the shutter aperture is to the shutter blade pivot and being positioned so that one end of the flange lies in the path of the beveled lug on the shutter blade to be engaged thereby when said shutter blades are moved by the handle to a set position, the trigger flange when in a rest position extending from the path of the beveled lug on the shutter blade in a direction opposite to that in which the trigger and cover blind are moved to move the cover blind from its rest position covering the exposure aperture, said trigger flange passing from the path of the beveled lug only after the trigger has been moved a distance to completely remove the cover blind from the exposure aperture.

CARL C. FUERST.

REFERENCES CITED

The following references are of record in the file of this patent:

UNITED STATES PATENTS

| Number | Name | Date |
| --- | --- | --- |
| 284,645 | Little | Sept. 11, 1883 |
| 1,250,354 | Ricketts | Dec. 18, 1917 |
| 1,274,262 | Gruss | July 30, 1918 |
| 2,051,225 | Riddell | Aug. 18, 1936 |
| 2,179,718 | Fedotoff | Nov. 14, 1939 |
| 2,326,077 | Steiner | Aug. 3, 1943 |
| 2,390,216 | Guedon | Dec. 4, 1945 |

FOREIGN PATENTS

| Number | Country | Date |
| --- | --- | --- |
| 11,476 | Great Britain | of 1890 |
| 507,594 | Germany | Sept. 18, 1930 |